United States Patent [19]

Kokuta et al.

[11] 3,915,724

[45] Oct. 28, 1975

[54] METHOD FOR THE MANUFACTURE OF AN IMPROVED ANHYDRITE

[75] Inventors: Hiroshi Kokuta, Chigasaki; Junichi Kasai, Tokyo, both of Japan

[73] Assignee: Nihon Hardon Kogyo Kabushiki Kaisha, Hiratsuka, Japan

[22] Filed: Mar. 1, 1974

[21] Appl. No.: 447,370

[30] Foreign Application Priority Data

Mar. 1, 1973    Japan.............................. 48-24658

[52] U.S. Cl. .................. 106/89; 106/315; 106/109; 106/90; 106/104
[51] Int. Cl.² ........................................... C04B 7/02
[58] Field of Search ............. 106/109, 110, 89, 315, 106/90, 104

[56] References Cited
UNITED STATES PATENTS
3,510,326   5/1970   Miki.................................... 106/109

FOREIGN PATENTS OR APPLICATIONS
691,336   7/1964   Canada................................ 106/89

*Primary Examiner*—Patrick P. Garvin
*Assistant Examiner*—John P. Sheehan
*Attorney, Agent, or Firm*—Browdy and Neimark

[57] ABSTRACT

A method for the manufacture of an improved anhydrite which adjusts and accelerates elution of various components of the hydrates of hydraulic cements at normal temperature and at elevated hydration temperatures, comprising adding at least one of the compounds of metals or non-metals belonging to Groups II to VIII of the Periodic Table or such metals or non-metals which form compounds by burning, to a substance containing, as a main component, gypsum or a substance which forms anhydrite by burning, and burning the mixture to a temperature of 400°C to 1,000°C.

The anhydrite of the invention provides hydrate of cement having a sufficiently long workability life at normal temperature and which hardens quickly at a desired time when heated to 60°C or above.

6 Claims, 2 Drawing Figures

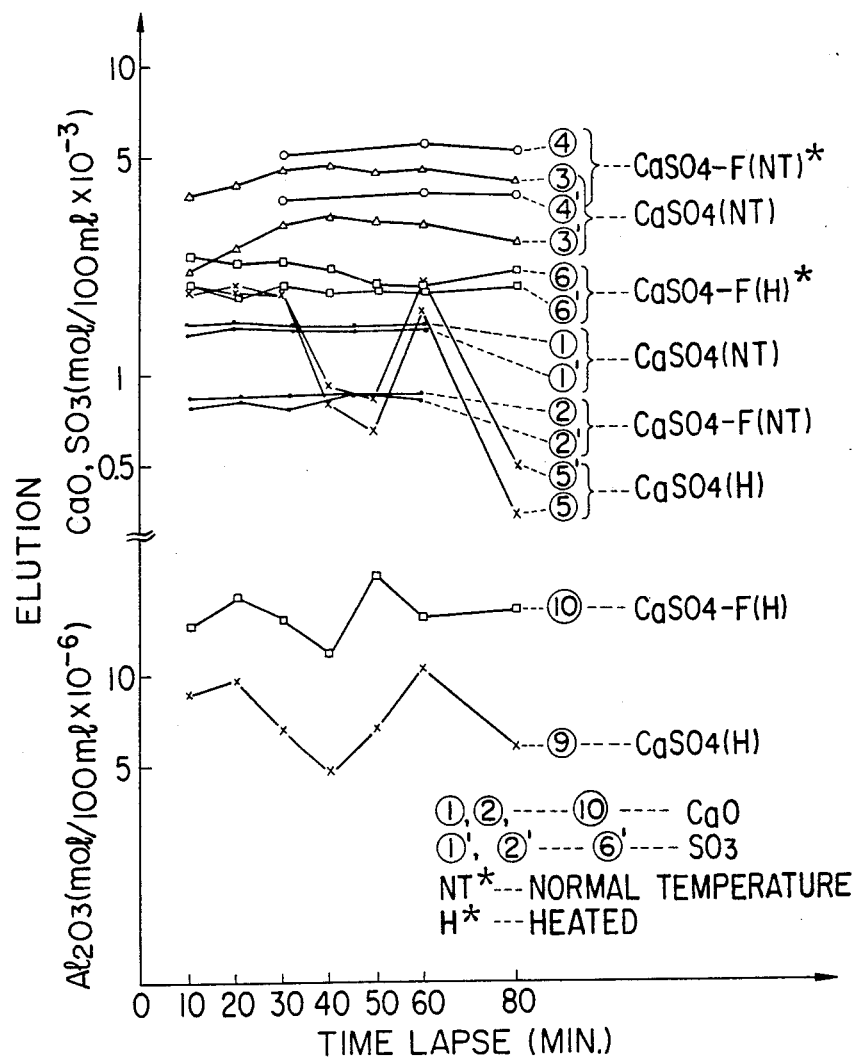

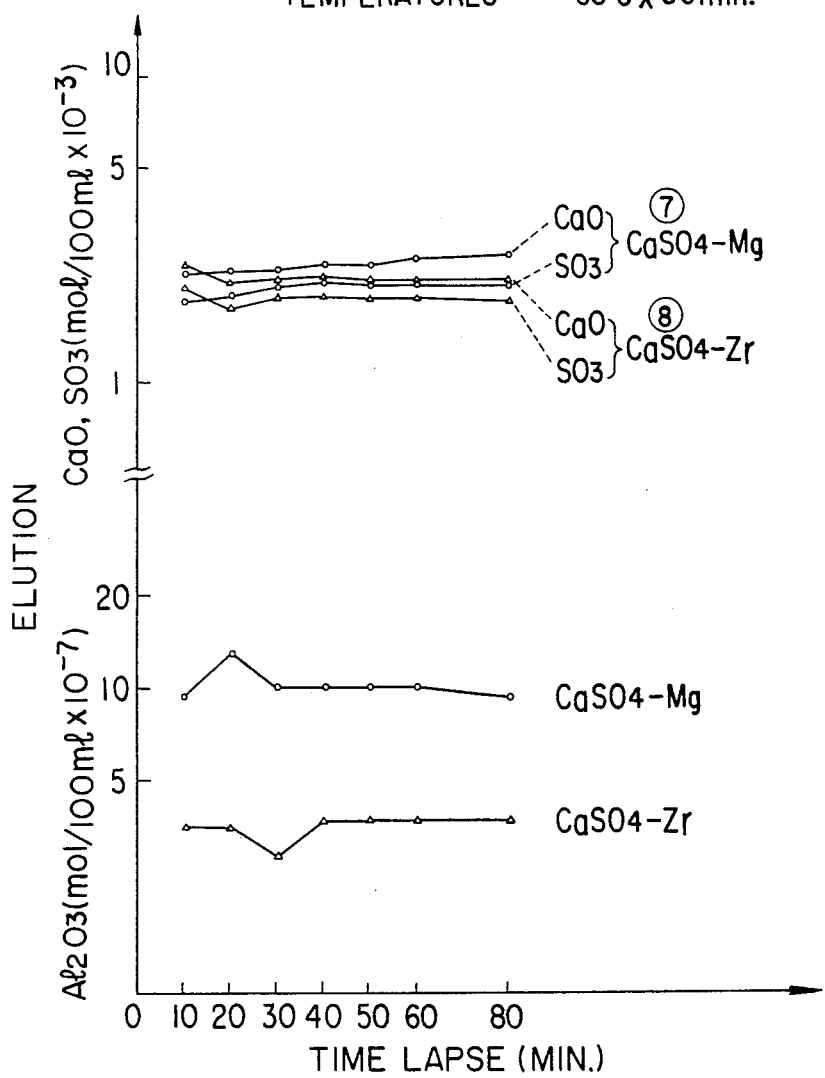

METHOD FOR THE MANUFACTURE OF AN IMPROVED ANHYDRITE

DETAILED EXPLANATION OF INVENTION

This invention relates to a method for producing an improved anhydrite by the presence of which the elution of the specific components contained in hydrated hydraulic cement can be controlled or accelerated, and a method for producing an improved hydraulic cement to which such improved anhydrite is added.

Hitherto, it has been commonly known to produce anhydrite by burning a type of gypsum. It is also well known for the ettringite containing mono- or tri-sulfate to be readily produced by mixing a certain cements with anhydrite. In this connection, it is believed that during the formation of the ettringite from solubilized gypsums the elution of alumina component from the cements will be controlled, and alumina components combined with lime component, will prevent the immediate setting of the cements.

Though such effect of a common anhydrite can be attained in the case of normal cements containing small amounts of alumina component, it is difficult to obtain the same effect in the case of a portland cement of a type that may quickly set at room temperature (hereinafter referred to as "quick setting cement"), such as those containing about 2% $CaO.Al_2O_3$ hydraulic component (hereinafter referred to as "alumina component"). In cases containing large amount of alumina component, it is impossible to control the immediate setting of hydrated cement by the use of gypsum alone. Then, as a method for controlling immediate setting, it has been proposed that alumina components be combined with halogen to form $C_3A_3.CaX_2$, $C_{11}A_7.CaX_2$ (wherein X is halogen, C corresponds to CaO and A corresponds to $Al_2O_3$), whereby the elution of alumina components in the initiation of hydration can be controlled. Though this method can make the lime components more or less inactive, the elution of the lime components cannot be controlled. It is, therefore, impossible to control the time of setting of cement so that the setting can take place at any time after 10–20 minutes. In order that such time of setting can be controlled, it is necessary to use a chelating agent which forms stable complexes with Ca ions for a certain length of time but which loses its chelating function or decomposes without adversely affecting its setting effect on cement.

Also, in order to accelerate the setting of hydraulic cement and generate the hardness thereof, it is necessary to accelerate the eluting of each of the components thereof maintaining the amount of elutes corresponding to the ratio of the reacted components. It has been difficult, however, to accelerate the eluting of the components if each of the components is freely selected. For instance, in order to adjust the workability life of the quick setting cement to more than one hour at room temperature, it is necessary to change Ca ions to a complex with the use of chelating agents as explained above. However, if the cement is heated, organic bonds are formed therein, whereby the eluting of lime components may be controlled and the generation of hardness may be prevented.

An object of the present invention is to provide an improved anhydrite in which the setting initiation time can be controlled and the hardness thereof can be generated by accelerating, controlling and adjusting the eluting of each of the components of hydraulic cement.

The improved anhydrite of the present invention is produced by adding one or more compounds, including oxides, of metals and non-metals belonging to Groups II–VIII of the Periodic Table or substances which form such compounds of metals and non-metals through burning, to gypsums or those substances which form anhydrite through burning, and burning such a mixture to a temperature of 400°C or above.

Adding the above improved anhydrite to a hydraulic cement containing gypsums and lime-containing substances which elute lime components by hydration enables the amount (in terms of $CaSO_4$) of gypsum component eluting from the hydrated cement to be maintained at a certain fixed level at natural temperature or hydration temperature.

Under the natural temperature (0°–35°C), the improved anhydrite of the present invention can adjust or control the amounts of lime components or alumina components eluting from the cement, thereby to enable said anhydrite to have a sufficient workability life. Again, under the hydration temperature, excepting cases under special conditions, the improved anhydrite can elute lime components in a greater amount gypsum components and also can accelerate the eluting of alumina component thereby to enable cement to set quickly.

As mentioned above, it is necessary to use chelating agents for adjusting the setting of the quick setting cement, but in the case the cement contains alumina components having halogen, the hydraulic cement can have a sufficient workability life, without any chelating agent, by the addition of the improved anhydrite of the present invention thereto.

It takes several hours until a normal cement or a super quick setting cement is set by heat treatment. An adjusted quick setting cement having a long workability life cannot be quickly set and produce strong hardness even if it is heat-treated. However, the addition of the improved anhydrite of the present invention enables the cement to have a good workability life, and also to be quickly set and to produce strong hardness upon heat treatment.

Gypsums for use in this invention include $SO_3$ compounds such as hemihydrate gypsum, gypsum dihydrate, anhydrite, calcium sulfite and alum.

It is commonly accepted in the art that when gypsum is added to cement for commercial use small amounts of impurities in gypsum, such as fluoric acid and phosphoric acid, should be eliminated. The presence of more than 200 ppm of any compound, including oxide, of metals and non-metals adversely affects workability life in some way or other. The present invention positively employs in substantial amounts the component regarded as inappropriate by the industry. The compounds, including oxides, of metals and non-metals belonging to Groups II to VIII used for the present invention include, for example, $MgSO_4.7H_2O$, $Na_2B_4O_7.10H_2O$, $ZnO$, $CaHPO_4$, $ZrO(NO_3)_2$, $PbO$, $Cr_2O_3$, $MnO_2$, $CaF_2$ and $Fe_2O_3$.

As the additive for the improved anhydrite of the present invention, compounds, such as oxides, of metals and non-metals considered to have a coordination number higher than the number of valency thereof appear to be particularly effective. Also, these compounds vary in their functions widely. For instance, the addition of magnesium sulfate or borax tends to increase the elution of alumina components. Anhydrite obtained by baking gypsum containing 50–100 percent based on the gypsum of borax does not deprive the anhydrite of the features of the present invention. Since, as explained above, functions differ substantially among additives, it is possible to choose additives depending upon the purpose and to impart to cement a combination of features by adding a plurality of additives thereto.

The term "lime-containing substance eluting lime components" used herein is meant to cover natural substances, chemical compounds and chemical by-products which upon hydration elute lime components and become alkaline, including quicklime, slaked lime, dolomite, dolomite plaster, slag, $CaO.SiO_2$ hydraulic compounds and $CaO.Al_2O_3$ hydraulic compounds. Thus, a saturated lime solution devoid of any solid components is also effective. When such a solution is used, only a small amount of the abovementioned additive will produce the effect of the present invention.

As mentioned above, the quick hardening cement containing as one of its components an alumina component having halogen, such as $C_{11}A_7CaF_2$ and $C_3ACaF_2$ also contains as a gypsum component known gypsums such as anhydrite, hemihydrate and $CaSO_4.2H_2O$. The setting initiation times or workability lives of these cements commercially available are short without exception, and are in the range of 10–20 minutes. The strengths of these cements one hour after hydration are below 50 kg/cm$^2$. In order to increase the initial strength it is necessary to increase the lime-containing substance. If the latter is increased, the workability life will decrease to almost an instant. Hardening heat will become higher and this results in cracking. We do not know of any invention in the past as to a cement which has an alumina component containing halogen and whose workability life can be freely regulated and yet whose feature is such that high strength can be obtained. A commercially available cement belonging to the quick hardening cement is one having 1–2 percent of free lime and a $C_{11}A_7CaF_2$ component. Even though a $SO_3$ component elutes excessively over the amount of lime component which elutes, the workability life is still in the range of 10–20 minutes and it is difficult to adjust coagulation by means of a gypsum component or a metal sulfate. Again, if in order to extend workability life coagulation is regulated in a long duration of time by adding a chelating agent which tends to form a complex with Ca ions, the strength of the cement will be substantially lowered, which apparently is a defeat of using a chelating agent for this purpose. If the improved anhydrite of the present invention is added to such a quick hardening cement, it becomes possible to regulate the length of workability life without recourse to a chelating agent. Also, the addition of the chelating agent in addition to the improved anhydrite does not prevent generation of a high strength.

The quick hardening cement is obtained in the form of a clinker by baking the material which contains CaO somewhat in excess of the lime saturation level. Thus, the cement contains free lime in an amount approximately 1% based on the cement. If the amount of the free lime increases beyond the above level, the workability life of the cement becomes extremely short even when an excess of gypsum or a metal sulfate is added. Thus, it is imperative to control strictly the mixing of the raw materials and the burning process. In the present invention, the CaO component can be mixed in excess of the lime saturation level, thereby making it very easy to control the burning process. Also, the existence of free lime in an excessive amount does not adversely affect the free adjustment of workability life by mixing the improved anhydrite of the present invention and the soluble gypsum. Further, the use of a chelating agent for extending workability life of a cement does not prevent the production of high strength. If the hydrate of the cement is heated at any time before its setting initiation time, it hardens quickly and develops a high strength, even when a chelating agent is mixed with the cement.

In summary, the improved anhydrite of the present invention, when added to a cement, accelerates elution of lime and $SO_3$ components at normal temperature of 0°–35°C. The elution is regulated and stable, and consequently regulates elution of the $Al_2O_3$ component so as to extend workability life. The saturation level of the eluting components in terms of gypsum is high and maintained at a fixed level. The workability life of the cement becomes stable and does not change substantially due to changes in the ambient temperature. If, however, the temperature becomes higher than 50 - 60°C, even though the saturation level decreases, elution of each component is accelerated. A higher strength of the cement is obtained in case the saturation level of the eluting components in terms of gypsum maintains a fixed level than in case the saturation level decreases as time passes.

The present invention will further be illustrated by the following examples by reference to the drawings in which both FIG. 1 and FIG. 2 illustrate the amounts of elutes from cements caused by the use of the known anhydrite and the improved anhydrite of the present invention.

EXAMPLE 1

The following experiment was carried out for the purpose of making clear the difference between the improved anhydrite of the present invention and the known anhydrite.

Calcinated gypsum was burned at 750°C for 2 hours to obtain the known anhydrite. Further, the improved anhydrite of the present invention was produced by adding 1 percent by weight of compounds of metals and non-metals and then burning at 750°C for 2 hours. The improved anhydrite of the present invention will hereinafter be referred to as $CaSO_4$—F, $CaSO_4$—Mg and the like, depending on the additives used.

In the beginning, in order to examine the effect of $CaF_2$ upon gypsum, the improved anhydrite mixed with 1 percent of $CaF_2$ was added to a calcined gypsum having the setting initiation time of 6 min. 50 sec., in the amount 5 percent by volume based on the latter. The setting initiation time was shortened to 4 min. 10 sec.. On the other hand, the addition of the known anhydrite did not cause any change.

From the above result, it is found that the improved anhydrite accelerated the elution of the calcinated gypsum and quickened the setting, whereas the known anhydrite did not exert any influence.

EXAMPLE 2

In order to observe the characteristics of the improved anhydrite of the present invention, the pH's of the hydrates of the following compounding ratios were measured. The results are shown in Table 1.

Table I.

| | I | II | III | IV | V | VI | VII | VIII |
|---|---|---|---|---|---|---|---|---|
| Components | | | | | | | | |
| Slaked lime | | | 10 | 10 | 10 | 10 | 10 | 10 |
| Calcinated gypsum | 10 | | | | | 13 | 13 | 13 |
| Known-anhydrite | | | 13 | | | 13 | | 13 |
| $CaSO_4$-F | | | | 13 | | | 13 | |
| Sodium citrate | | | | | | | | 0.5 |
| pH | | | | | | | | |
| 5 min.* | 6.4 | | 12.62 | 12.72 | 12.54 | 12.49 | 12.52 | 12.51 |
| 15 min. | 6.3 | | 12.62 | 12.67 | 12.54 | 12.51 | 12.52 | 12.55 |
| 30 min. | set | | 12.60 | 12.64 | 12.55 | 12.51 | 12.52 | 12.55 |
| 60 min. | | | 12.58 | 12.58 | 12.55 | 12.50 | 12.52 | 12.55 |

*Time lapse from the hydration

From the above results, it is found, with respect to the function of the improved anhydrite, that (1) the elution was stably promoted without decreasing the pH of slaked lime, that (2) the pH of slaked lime was extremely stable under coexistence of a soluble gypsum. In case of the known anhydrite, however, the pH was made stable only by adding a chelating agent. The improved anhydrite controlled the pH of the lime component like the buffering action of the chelating agent, under the coexistence of soluble gypsum.

EXAMPLE 3

5 parts of the improved anhydrite of the present invention ($CaSO_4$—F) and 3 parts of calcinated gypsum were added to 100 parts of jet cement manufactured by Sumitome Cement Co., which is a quick setting cement having the setting initiation time of about 10 minutes and containing about 20 percent of $C_{11}A_7CaF_2$ and about 17 percent of the known anhydrite and hemihydrate. The setting initiation time was 45 minutes. Further, when 5 parts of $CaSO_4$—F and 5 parts of calcined gypsum was added, the setting initiation time was 85 minutes. By heating, the cement quickly hardened and high strength was obtained. It is concluded that the improved anhydrite of the present invention has the function of controlling the setting of cement just like the chelating agent, whereas the known anhydrite does not have the same function.

EXAMPLE 4

Hydraulic cements containing as components gypsums and lime, mixed with either the known anhydrite ($CaSO_4$) or the improved anhydrite of the present invention ($CaSO_4$—F), were quantitatively measured by changing time lapses and temperatures. The results are shown in FIG. 1. The cement contained 50 parts of super-quick setting cement manufactured by Nippon Cement Co., 24 parts of Denka alumina cement No. 2 manufactured by Denki Kagaku Co., 10 parts of slaked lime (CH), 13 parts of calcined gypsum (½CS), 13 parts of anhydrite ($CaSO_4$) and 0.5 part of sodium citrate (CANa). The setting initiation time measured by a cement standard test (JISR-5201) was 135 minutes when the known anhydrite was used, and was 250 minutes when the improved anhydrite ($CaSO_4$—F obtained by adding 1% of $CaF_2$) was used. The testing was conducted in accordance with the gypsum chemical analysis prescribed by JIS R-9101 for determining the amount of elution of CaO and $SO_3$, and the amount of $Al_2O_3$ elution was measured according to JIS G-1224 for quantitative analysis of alumina components in iron and steel. The amount of each sample was 30 gm/300 ml. The amount of elution of the $SO_3$ component from anhydrite itself (not added to cement) was larger in case of the known anhydrite (1) than in case of the anhydrite of the present invention. Nevertheless, when these were added to the hydraulic cement of the above composition, the amount of elution of gypsum components and lime components at ambient temperatures (20°C ± 1°C) were larger in case of the anhydrite of the present invention 4, 4' than in case of known anhydrite 3, 3'. Moreover, the anhydrite of the present invention maintained the amount of elution of the gypsum component values in terms of $CaSO_4$ at a constant level. By heating the hydrated cement at 65°C for 30 minutes, the difference between the two became remarkable. As shown by 6 and 6', the anhydrite of the present invention maintained the elution of the gypsum component at a constant level corresponding to the high temperature. The amount of elution of the lime component was always larger than that of the gypsum component. On the contrary, as shown by 5 and 5', the elution of the lime component was less than that of the gypsum component in case of the known anhydrite.

From the above facts, it is clear that, in spite of the fact that the elution of the gypsum component from the anhydrite of the present invention itself is small at ambient temperatures, once this anhydrite is added to a hydraulic cement having as its components gypsums and limes, the elution of the gypsum component at ambient temperatures is increased, in comparison with the case of the known anhydrite. The anhydrite of this invention also promotes the elution of the CaO component. Furthermore, the difference between the anhydrite of this invention and the known anhydrite becomes obvious during heating. The anhydrite of the present invention elutes the lime component at a higher level than that of the $SO_3$ component, while maintaining the elution of the $SO_3$ component at a component at a constant level. As a result, the amount of elution in terms of the gypsum component is maintained at a constant level. On the contrary, in case of the known anhydrite, the $SO_3$ component always elutes in a larger amount than the CaO component, and the amount of elution in terms of the gypsum component is reduced to the level of the CaO component, and elution tends to decrease.

The results of the testing indicate that the anhydrite of the present invention, while maintaining the elution of the $SO_3$ component on certain constant levels depending on the temperature, whether at normal temperature of 0°C to 35°C, or at elevated temperatures, elutes the CaO component in a larger amount than the $SO_3$ component, and that both the CaO component and the $SO_3$ component cooperate with each other so as to maintain a certain level of elution. The amount of elution of the $CaSO_4$ component from the anhydrite of the present invention containing 1% of $MgSO_4.7H_2O$ and $ZrO(NO_3)_2$ respectively (referred to as $CaSO_4—Mg$ and $CaSO_4—Zr$) is shown as 7 and 8. It showed the same tendency as $CaSO_4—F$. The same result was obtained as regards the other metals and nonmetals mentioned above. Also, as regards the $Al_2O_3$ component, the anhydrite of the present invention ($CaSO_4—F$), 10 when heated caused larger elution than the case of the known anhydrite 9. This indicates the effect of the anhydrite of the present invention to accelerate elution of cement components during heating. The elution of the $Al_2O_3$ component, however, is controlled at normal temperature because then the $SO_3$ component is supersaturated. As seen from the above descriptions it is evident that the improved anhydrite of the present invention expedites and stably controls and adjusts the elution of each component of a hydraulic cement both at normal temperature and when heated.

EXAMPLE 5

In accordance with the method described in embodiment 3 of French Pat. No. 2,010,691 with respect to a method of producing Portland cement clinker comprising $C_{11}A_7CaF_2$ a clinker having 20% of $C_{11}A_7CaF_2$ was prepared. To 100 parts of this clinker 3 parts of slaked lime, 7 parts of hemihydrate and 10 parts of the before-mentioned lime, improved anhydrite $CaSO_4—F$ were added. The mixture was crushed and a variation of Portland cement was formed. The workability life of said variation of Portland cement was 90 minutes under atmosphere temperature, but when it was steam-treated at 70°C for 30 minutes immediately after mixing, a strength of 160 kg/cm² was obtained in an hour after the initial mixing, and a strength of 350 kg/cm² obtained in a day after the initial mixing (based on the test of JIS R-5201). Commercially available jet cement produced by Onoda Cement Co., which is the same product as that of above-mentioned French patent, shows a workability life of 10 minutes, strength of 26 kg/cm² in an hour and of 207 kg/cm² in a day, but when 5 parts of said $CaSO_4—F$ and 3 parts of calcined gypsum are added to it, a workability life of 45 minutes was obtained, and when steam-treated as mentioned above, a strength of 150 kg/cm² in an hour and of 370 kg/cm² in a day was obtained.

Further, when the anhydrite of the present invention is used as the anhydrite component of the cement of Example 4, the cement obtained, after steam treatment at 75°C for 30 minutes, strength of 165 kg/cm² in an hour, strength of 260 kg/cm² in a day and strength of 370 kg/cm² in seven days equivalent to strength in four weeks in the usual cement.

5 parts of the above-mentioned $CaSO_4—F$ and 3 parts of gypsum were added to the super-quick setting Portland cement of Onoda Cement Co. The standard mortar prepared from the above cement was heated to 70°C and the changes of the strength of the mortar were tested after 3, 4 and 5 hours. The results are listed below.

|  | Without additives | With the additives of the present invention |
|---|---|---|
| 3-hour strength | 120 kg | 160 kg |
| 4-hour strength | 170 kg | 190 kg |
| 5-hour strength | 200 kg | 240 kg |

As reaction equivalents of gypsum components and alumina components which are necessary in producing ettringite are included in the cement used for the testing, it can be seen that the strength was improved as a result of the improved anhydrite of the present invention.

EXAMPLE 6

To 100 parts of Denka alumina cement No. 1 2 parts of slaked gypsum, 3 parts of hemihydrate and 5 parts of $CaSO_4—F$ were added and the strength and the workability life was measured. The strength of 570 kg was attained in a day, and 900 kg in seven days, which strength surpassed the four-week strength, 750 kg, of Denka alumina cement. The setting initiation time decreased in 120 minutes. Further, to 100 parts of the above-described jet cement were added 5 parts of $CaSO_4—F$ of the present invention and 5 parts of dihydrate, and the mixture was steam-treated at 70°C for 30 minutes in a like manner as the previous test. The standard testing conducted indicates that a high strength of 400 kg was produced in one day, 640 kg in seven days, which strength surpasses the originally intended four-week strength of the cement.

EXAMPLE 7

As the gypsum obtained as a by-product of fluoric acid produced by Nitto Fusso Kogyo Co. is substantially separated from fluoric acid, the fluorine component was determined in the amount below 100 ppm. This anhydrite was used instead of $CaSO_4—F$ of the present invention in Example 2, and the pH testing was conducted. The pH of the lime component was maintained stable for the initial 30 minutes, but became unstable thereafter. The fluorine content of $CaSO_4—F$ was then changed over 200–1,000 ppm, and the strength testing of the cement with the same composition was carried out as the cement shown in Example 4. All the tests indicated that the one-hour strength was above 100 kg/cm².

EXAMPLE 8

The improved anhydrite of the present invention was prepared by adding 1 part of $CaF_2$ to 100 parts of calcined gypsum reagent and burning the mixture in an electric oven at a temperature of 750°C for 2 hours. When 5 g of this was mixed with 100 g of calcined gypsum having a setting initiation time of 7 min. 30 sec., the latter's setting initiation time decreased to 4 min. 30 sec. These setting initiation time periods were measured by the method of JIS R-5201. The setting initiation time increased to 21 min. 10 sec. by mixing 100 g of the above-mentioned calcined gypsum with 10 g of slaked lime and 40 g of the improved anhydrite of the present invention.

EXAMPLE 9

13 parts of the anhydrite of this invention used in Example 8 was added to the mixture of 53 parts of the super-quick setting Portland cement manufactured by Nippon Cement Co., 24 parts of Denka Alumina Cement No. 2 manufactured by Denki Kagaku Co., 13 parts of calcined gypsum, 10 parts of slaked lime and 0.5 parts of sodium citrate to produce a cement. 30 g of the obtained cement was added to 300 ml of purified water and the amount of elution of each component was measured by the analytical methods of JIS R-9101 and JIS G-1224 and indicated the elution level similar to those levels obtained by the improved anhydrite of the present invention illustrated in FIG. 1.

This cement was tested by the method of JIS R-5201 and its workability life was 250 minutes. When ten minutes had elapsed after mixing was initiated, steam treating was carried out at 70°C for 30 minutes and the strength was measured and indicated 148 kg/cm² after one hour, 264 kg/cm² after one day and 370 kg/cm² after 7 days. There is no perceivable difference in strength between use of calcined gypsum and use of dihydrate as a component of the cement.

EXAMPLE 10

The anhydrite of the present invention used in Example 8 was burned at temperatures of 400°C, 600°C and 1,000°C, and the strength after mixing with the composition used in Example 9 was measured and showed greater than 100 kg/cm² after one hour in every case.

EXAMPLE 11

The anhydrite of the present invention was made by adding compounds containing various metal and nonmetal oxides to 100 parts of calcined gypsum reagent in the following proportion and burning them at 800°C for 2 hours; the workability life and the strength were measured by the method used in Example 9 and showed the results shown in Table II.

Table II

| No. | Cements and additives | Workability life min. | strength Kg/cm² | |
|---|---|---|---|---|
| | | | 1 hour | 1 day |
| 1 | $CaSO_3.2H_2O+O$ | 210 | 66 | 87 |
| 2 | $CaSO_3.2H_2O+Fe_2O_3\times 1\%$ | 240 | 138 | 161 |
| 3 | $CaSO_4.1/2H_2O+Na_2B_4O_7\times 60\%$ | 70 | 165 | 230 |
| 4 | $CaSO_4.2H_2O+MgSO_4.7H_2O\times 1\%+Fe_2O_3\times 1\%$ | 180 | 140 | 240 |
| 5 | $CaSO_4.2H_2O+ZrO(NO_3)_2\times 1\%+Fe_2O_3\times 1\%$ | 300 | 125 | 220 |
| 6 | $CaSO_4+(NH_4)_2HPO_4\times 1\%$ | 280 | 130 | 220 |
| 7 | $CaSO_4.1/2H_2O+CaF_2\times 1\%$ | 250 | 155 | 240 |
| 8 | $CaSO_4.1/2H_2O+CaF_2\times 500\ ppm+Fe_2O_3\times 5\%$ | 125 | 113 | 205 |

What is claimed is:

EXAMPLE 12

The standard mortar of the super-quick setting cement made by Onoda Cement Co. containing no improved anhydrite of the invention and the standard mortar to which was added 3 parts of the improved anhydrite of this invention used in Example 8 were steam-treated at 75°C for 3 hours and the strength thereof was measured; the former showed 120 kg/cm² after one hour and the latter 145 kg/cm² after one hour and 230 kg/cm² after one day.

EXAMPLE 13

To calcite, kaolin, and $CaF_2$ described in an example of French Pat. No. 2,010,691, quick lime was added so as to produce free lime and pellets were made. The pellets were burned at 1,300°C for 40 minutes to produce clinker. To 100 parts of the product were added 10 parts of the anhydrite of this invention used in Example 8 and 10 parts of hemihydrate. The mixture was ground to 4,000 in Blaine value, and the workability life of this standard mortar was 80 minutes and when subjected to infrared heating at 70°C for 30 minutes immediately after mixing, the strength was 180 kg/cm² after one hour and 405 kg/cm² after one day. When 0.2 parts of 2-ketogluconic acid was added to this cement the setting initiation time was 120 minutes and after infrared heating the strength was 155 kg/cm² after one hour and 380 kg/cm² after one day.

EXAMPLE 14

To jet cement made by Onoda Cement Co. there was added 5 parts of the anhydrite of this invention used in Example 8 and 5 parts of hemihydrate. The setting initiation time was 55 minutes, and after steam treating at 70°C for 30 minutes, the strength was 185 kg/cm² after one hour, 360 kg/cm² after one day and 480 kg/cm² after 7 days. When, in addition, 0.5 parts of sodium citrate was added to this cement the setting initiation time was 140 min. and after steam treating the strength was 155 kg/cm² after one hour and 340 kg/cm² after one day.

EXAMPLE 15

A standard mortar was prepared by adding 2 parts of slaked lime, 5 parts of hemihydrate and 5 parts of the anhydrite of this invention used in Example 8 to 100 parts of Denka alumina cement No. 1 manufactured by Denki Kagaku Co. and the setting initiation time and the strength were measured; results showed a setting initiation time of 120 min. and the strength of 570 kg/cm² after one day and 900 kg/cm² after 7 days, which were greater than that of Denka alumina cement No. 1 itself, without the addition of the improved anhydrite, after 4 weeks.

EXAMPLE 16

To 100 parts of the said Denka alumina cement No. 1 was added 1% of $MgSO_4.7H_2O$. The mixture was burned. 10 parts of anhydrite burned at 800°C for 2 hr. and 20 parts of fly ash were added, and pH of hydrate thereof was measured. The product indicated a pH value of 12.2. When the product was heated to over 60°C the elution of $Al_2O_3$ component was 20 percent larger than that in the case of using the known anhydrite.

EXAMPLE 17

The anhydrite was made by the addition of various metals and $CaF_2$ in the following proportions and burning the mixture at 700°C for 2 hours to produce various cements, the setting initiation times of which were measured. The results are shown in Table III.

Table III

| Runs | Alumina Cement manufactured by Nippon Cement Co. 24 parts | White Cement made by Nippon Cement Co. 50 parts | Anhydrite 26 parts (Additives %) | Sodium Citrate 0.5 part | Setting Initiation Time min. |
|---|---|---|---|---|---|
| (1) | o | o | o | x | 6 |
| (2) | o | o | o | o | 105 |
| (3) | o | o | ZnO×4 | o | 180 |
| (4) | | | ZnO×2 CaF$_2$×1 | o | 260 |
| (5) | o | o | Cr$_2$O$_3$×4 | o | 245 |
| (6) | o | o | Cr$_2$O$_3$×4 CaF$_2$×1 | o | 270 |

The mark o in Table III indicates the addition of the component.
The mark u used in the anhydrite column indicates non-addition of the anhydrite.

What is claimed is:

1. A method for the manufacture of an improved anhydrite which adjusts and accelerates elution of components of hydraulic cement hydrates at normal temperature and at hydration temperature, comprising adding at least one of the compounds selected from the group consisting of $MgSO_4 \cdot 7H_2O$, $Na_2B_4O_7 \cdot 10H_2O$, $ZnO$, $CaHPO_4$, $ZrO(NO_3)_2$, $PbO$, $Cr_2O_3$, $MnO_2$, $CaF_2$ and $Fe_2O_3$ to a natural substance or chemical composition containing, as a main component, gypsum or a substance which forms anhydrite by burning, said compound being added in an amount sufficient to accelerate elution of compounds of hydraulic cement hydrates when the resultant anhydrite is mixed with hydraulic cement; and
burning the mixture to a temperature of 400°C to 1,000°C.

2. A method for the manufacture of a hydraulic cement which produces high strength and whose setting initiation time can be freely adjusted, comprising adding the improved anhydrite obtained by the method of claim 1 to a hydraulic cement containing as main components at least one of (1) a $CaO \cdot Al_2O_3$ hydraulic component, (2) a $CaO \cdot SiO_2$ hydraulic component and (3) gypsum or a substance which forms anhydrite by burning.

3. A method for the manufacture of a hydraulic cement which produces high strength and elution of the components of which can be adjusted and accelerated, comprising adding the improved anhydrite obtained by the method of claim 1 to a hydraulic cement, causing the mixture to hydrate to form a hydrate having a sufficient workability life at normal temperature, and then heating the hydrate at a desired time to 60°C or above.

4. A method for the manufacture of a hydraulic cement which hardens quickly by application of heat producing high strength and whose workability life can be freely adjusted, comprising adding the improved anhydrite obtained by the method of claim 1 to a hydraulic cement containing as main components at least one of (1) a $CaO \cdot Al_2O_3$ hydraulic component having halogen, (2) a $CaO \cdot SiO_2$ hydraulic component with or without an excess of free lime, and (3) gypsum or a substance which forms anhydrite by burning.

5. A method according to claim 2 further comprising adding an organic or inorganic chelating agent.

6. A method according to claim 4 further comprising adding a chelating agent, and then mixing together said anhydrite, said hydraulic cement and said chelating agent.

* * * * *